United States Patent
Tan

(10) Patent No.: US 12,481,002 B2
(45) Date of Patent: Nov. 25, 2025

(54) CLAMP METER SYSTEM WITH BATTERY-INTERNAL-RESISTANCE-MEASURING FUNCTION

(71) Applicant: BRYMEN TECHNOLOGY CORPORATION, New Taipei (TW)

(72) Inventor: Po-Chao Tan, New Taipei (TW)

(73) Assignee: BRYMEN TECHNOLOGY CORPORATION, New Taipei (TW)

( * ) Notice: Subject to any disclaimer, the term of this patent is extended or adjusted under 35 U.S.C. 154(b) by 176 days.

(21) Appl. No.: 18/467,422

(22) Filed: Sep. 14, 2023

(65) Prior Publication Data

US 2024/0418788 A1 Dec. 19, 2024

(30) Foreign Application Priority Data

Jun. 13, 2023 (TW) ................ 112122010

(51) Int. Cl.
| | |
|---|---|
| G01R 31/389 | (2019.01) |
| G01R 31/36 | (2020.01) |
| G01R 31/371 | (2019.01) |
| G01R 31/3842 | (2019.01) |

(52) U.S. Cl.
CPC ....... G01R 31/389 (2019.01); G01R 31/3646 (2019.01); G01R 31/371 (2019.01); G01R 31/3842 (2019.01)

(58) Field of Classification Search
None
See application file for complete search history.

(56) References Cited

U.S. PATENT DOCUMENTS

| | | | | |
|---|---|---|---|---|
| 6,556,020 B1* | 4/2003 | McCabe | .............. | G01R 31/389 |
| | | | | 324/426 |
| 2001/0033169 A1* | 10/2001 | Singh | ................... | G01R 31/392 |
| | | | | 324/426 |
| 2015/0066262 A1* | 3/2015 | Chang | ..................... | B60L 58/21 |
| | | | | 701/22 |
| 2017/0131360 A1* | 5/2017 | Kawahara | .......... | G01R 31/3648 |
| 2018/0267109 A1* | 9/2018 | Kutkut | ................. | G01R 31/389 |

* cited by examiner

Primary Examiner — Jas A Sanghera
(74) Attorney, Agent, or Firm — MUNCY, GEISSLER, OLDS & LOWE, P.C.

(57) ABSTRACT

A clamp meter system with a battery-internal-resistance-measuring function includes a first processing unit, an analog-to-digital converting circuit, a current-measuring circuit, a direct-current current sensor, a voltage-attenuating network and a voltage probe set. The first processing unit uses the analog-to-digital converting circuit, the current-measuring circuit, the direct-current current sensor, the voltage-attenuating network and the voltage probe set to measure a battery current and a battery total voltage of a plurality of batteries to obtain a second digital current signal and a second digital voltage signal. A first digital voltage signal subtracts the second digital voltage signal to obtain a voltage difference. The second digital current signal subtracts a first digital current signal to obtain a current difference. The voltage difference is divided by the current difference to obtain an overall internal resistance value of the batteries.

7 Claims, 4 Drawing Sheets

CLAMP METER SYSTEM WITH BATTERY-INTERNAL-RESISTANCE-MEASURING FUNCTION

BACKGROUND OF THE DISCLOSURE

Technical Field

The present disclosure relates to a clamp meter system, and especially relates to a clamp meter system with a battery-internal-resistance-measuring function.

Description of Related Art

The internal resistance of the battery is an important basis for evaluating whether the battery is aged. Once the battery is seriously aged, the battery must be replaced with a new battery to avoid affecting the energy storage effect. In addition to the internal resistance of the battery will slowly increase with the increase of the use time, the internal resistance of the battery is not constant; in the process of charging and discharging, the internal resistance of the battery will continue to change with time; this is because the composition of the active material, the concentration and the temperature of the electrolyte are constantly changing.

Although the internal resistance of the battery is an important basis for evaluating whether the battery is aged, the current methods for measuring the internal resistance of the battery are very complicated, which is a pity.

SUMMARY OF THE DISCLOSURE

In order to solve the above-mentioned problems, an object of the present disclosure is to provide a clamp meter system with a battery-internal-resistance-measuring function.

In order to achieve the object of the present disclosure mentioned above, the clamp meter system with the battery-internal-resistance-measuring function of the present disclosure is applied to a plurality of batteries. The batteries are connected in series with each other and electrically connected to the clamp meter system. The clamp meter system includes a first processing unit, an analog-to-digital converting circuit, a current-measuring circuit, a direct-current current sensor, a voltage-attenuating network, and a voltage probe set. The analog-to-digital converting circuit is electrically connected to the first processing unit. The current-measuring circuit is electrically connected to the analog-to-digital converting circuit. The direct-current current sensor is electrically connected to the current-measuring circuit. The voltage-attenuating network is electrically connected to the analog-to-digital converting circuit. The voltage probe set is electrically connected to the voltage-attenuating network and the batteries. Moreover, the first processing unit is configured to use the analog-to-digital converting circuit, the current-measuring circuit, the direct-current current sensor, the voltage-attenuating network, and the voltage probe set to measure a battery current and a battery total voltage of the batteries to obtain a second digital current signal and a second digital voltage signal. The first processing unit is configured to subtract the second digital voltage signal from a first digital voltage signal to obtain a voltage difference. The first processing unit is configured to subtract a first digital current signal from the second digital current signal to obtain a current difference. The first processing unit is configured to divide the voltage difference by the current difference to obtain an overall internal resistance value of the batteries.

Moreover, in an embodiment of the clamp meter system with the battery-internal-resistance-measuring function of the present disclosure mentioned above, the clamp meter system further includes a first display electrically connected to the first processing unit. Moreover, the first processing unit is configured to transmit the overall internal resistance value of the batteries to the first display to display the overall internal resistance value of the batteries. At a first time point, the first processing unit is configured to use the analog-to-digital converting circuit, the voltage-attenuating network and the voltage probe set to measure the battery total voltage of the batteries to obtain the first digital voltage signal. The first processing unit is configured to set the first digital current signal to be zero. At a second time point, the first processing unit is configured to use the analog-to-digital converting circuit, the current-measuring circuit, the direct-current current sensor, the voltage-attenuating network, and the voltage probe set to measure the battery current and the battery total voltage of the batteries to obtain the second digital current signal and the second digital voltage signal.

Moreover, in an embodiment of the clamp meter system with the battery-internal-resistance-measuring function of the present disclosure mentioned above, the clamp meter system further includes a first wireless communication transceiver circuit electrically connected to the first processing unit.

Moreover, in an embodiment of the clamp meter system with the battery-internal-resistance-measuring function of the present disclosure mentioned above, the clamp meter system further includes a second wireless communication transceiver circuit electrically connected to the first wireless communication transceiver circuit.

Moreover, in an embodiment of the clamp meter system with the battery-internal-resistance-measuring function of the present disclosure mentioned above, the clamp meter system further includes a second processing unit electrically connected to the second wireless communication transceiver circuit. Moreover, the first processing unit is configured to transmit the overall internal resistance value of the batteries to the second processing unit through the first wireless communication transceiver circuit and the second wireless communication transceiver circuit. The second processing unit is configured to compare the overall internal resistance value of the batteries with an overall internal resistance threshold value. When the overall internal resistance value of the batteries is greater than the overall internal resistance threshold value, the clamp meter system is configured to perform a respective battery internal resistance measuring procedure on each of the batteries to measure an internal resistance value of each of the batteries.

Moreover, in an embodiment of the clamp meter system with the battery-internal-resistance-measuring function of the present disclosure mentioned above, the clamp meter system further includes a second display electrically connected to the second processing unit. Moreover, the second processing unit is configured to transmit the overall internal resistance value of the batteries to the second display to display the overall internal resistance value of the batteries.

Moreover, in an embodiment of the clamp meter system with the battery-internal-resistance-measuring function of the present disclosure mentioned above, the analog-to-digital converting circuit is a fast high-resolution analog-to-digital converter to switch the current-measuring circuit and the voltage-attenuating network, or the analog-to-digital converting circuit includes a plurality of analog-to-digital converters which are electrically connected to the current-measuring circuit and the voltage-attenuating network respectively.

Moreover, in an embodiment of the clamp meter system with the battery-internal-resistance-measuring function of the present disclosure mentioned above, the current-measuring circuit is a galvanometer. The voltage-attenuating network is an attenuator.

Moreover, in an embodiment of the clamp meter system with the battery-internal-resistance-measuring function of the present disclosure mentioned above, the first wireless communication transceiver circuit is a Bluetooth wireless communication circuit. The second wireless communication transceiver circuit is a Bluetooth wireless communication circuit.

Moreover, in an embodiment of the clamp meter system with the battery-internal-resistance-measuring function of the present disclosure mentioned above, the first processing unit is a microprocessor or a microcontroller. The second processing unit is a microprocessor or a microcontroller.

The advantage of the present disclosure is to easily measure the internal resistance of the battery.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
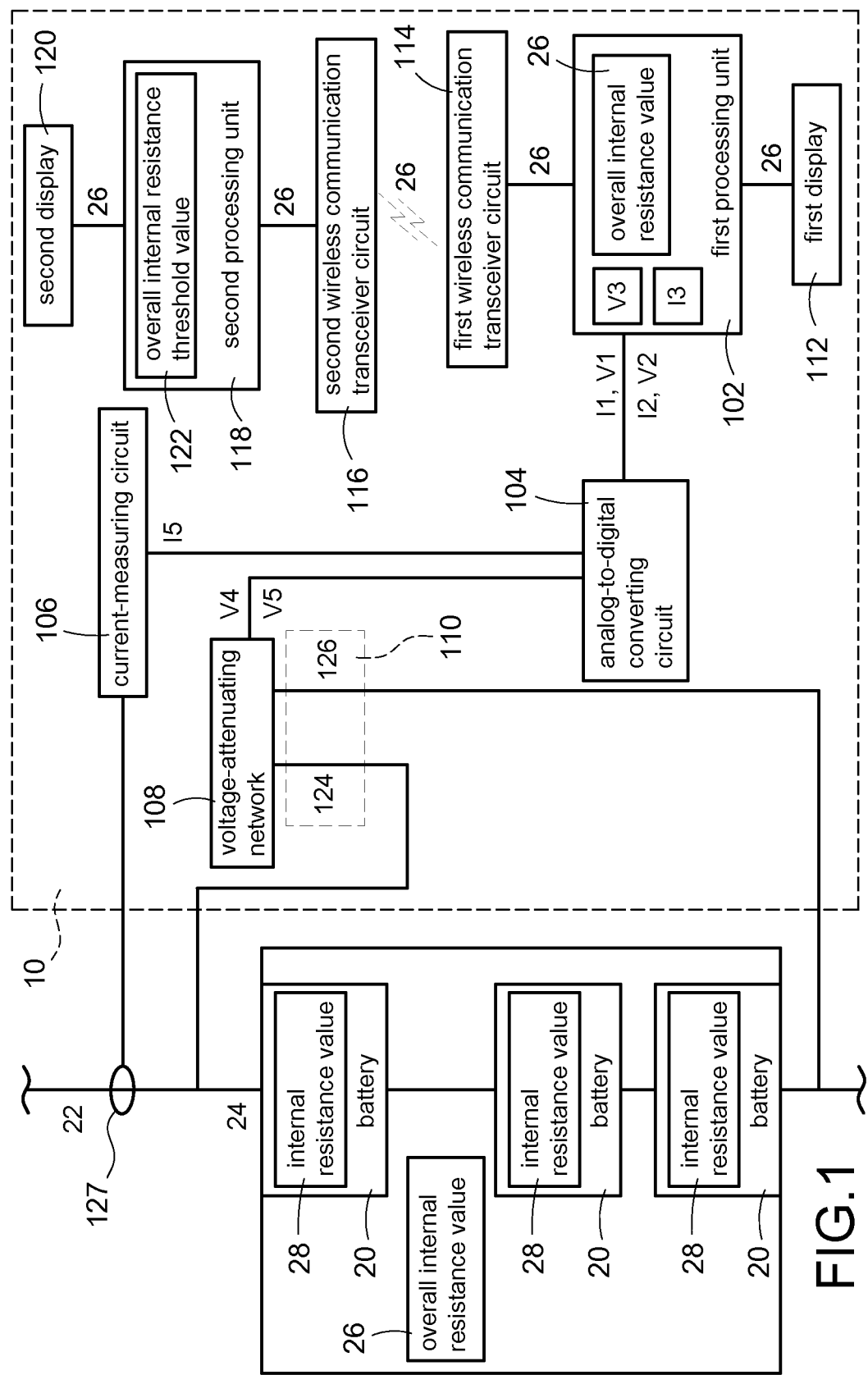
FIG. 1 shows a block diagram of the first embodiment of the clamp meter system with the battery-internal-resistance-measuring function of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a block diagram of the first embodiment of the clamp meter system 10 with the battery-internal-resistance-measuring function of the present disclosure. The clamp meter system 10 with the battery-internal-resistance-measuring function is applied to a plurality of batteries 20. The batteries 20 are connected in series with each other and electrically connected to the clamp meter system 10. The clamp meter system 10 includes a first processing unit 102, an analog-to-digital converting circuit 104, a current-measuring circuit 106, a voltage-attenuating network 108, a voltage probe set 110, a first display 112, a first wireless communication transceiver circuit 114, a second wireless communication transceiver circuit 116, a second processing unit 118, a second display 120 and a direct-current current sensor 127. Although FIG. 1 only shows three batteries 20, the present disclosure is not limited thereto; for example, the present disclosure may include thirty batteries 20, or even more batteries 20. The direct-current current sensor 127 clamps/hooks on a load current loop line of the batteries 20.

The batteries 20, the first processing unit 102, the analog-to-digital converting circuit 104, the current-measuring circuit 106, the voltage-attenuating network 108, the voltage probe set 110, the first display 112, the first wireless communication transceiver circuit 114 and the direct-current current sensor 127 are electrically connected to each other. The second wireless communication transceiver circuit 116 is wirelessly connected to the first wireless communication transceiver circuit 114. The second wireless communication transceiver circuit 116, the second processing unit 118 and the second display 120 are electrically connected to each other. The voltage probe set 110 includes a first probe 124 and a second probe 126. The first probe 124 is connected to the top of the batteries 20 shown in FIG. 1. The second probe 126 is connected to the bottom of the batteries 20 shown in FIG. 1.

The battery 20 is, for example but not limited to, a lithium battery. The analog-to-digital converting circuit 104 is, for example but not limited to, a fast high-resolution analog-to-digital converter to switch the current-measuring circuit 106 and the voltage-attenuating network 108, or the analog-to-digital converting circuit 104 includes a plurality of analog-to-digital converters which are electrically connected to the current-measuring circuit 106 and the voltage-attenuating network 108 respectively. The current-measuring circuit 106 is, for example but not limited to, a galvanometer. The voltage-attenuating network 108 is, for example but not limited to, an attenuator. The first wireless communication transceiver circuit 114 is, for example but not limited to, a Bluetooth wireless communication circuit. The second wireless communication transceiver circuit 116 is, for example but not limited to, a Bluetooth wireless communication circuit. The first processing unit 102 is, for example but not limited to, a microprocessor or a microcontroller, which at least has the control, calculation and recording functions. The second processing unit 118 is, for example but not limited to, a microprocessor or a microcontroller, which at least has the control, calculation and recording functions.

The first processing unit 102 is configured to use the analog-to-digital converting circuit 104, the current-measuring circuit 106, the direct-current current sensor 127, the voltage-attenuating network 108 and the voltage probe set 110 to measure a battery current 22 and a battery total voltage 24 of the batteries 20 to obtain a second digital current signal I2 and a second digital voltage signal V2. The first processing unit 102 is configured to subtract the second digital voltage signal V2 from a first digital voltage signal V1 to obtain a voltage difference V3. The first processing unit 102 is configured to subtract a first digital current signal I1 from the second digital current signal I2 to obtain a current difference I3. The first processing unit 102 is configured to divide the voltage difference V3 by the current difference I3 to obtain an overall internal resistance value 26 of the batteries 20. At a first time point, the first processing unit 102 is configured to use the analog-to-digital converting circuit 104, the voltage-attenuating network 108 and the voltage probe set 110 to measure the battery total voltage 24 of the batteries 20 to obtain the first digital voltage signal V1. The first processing unit 102 is configured to set the first digital current signal I1 to be zero. More specifically, at the first time point, the voltage-attenuating network 108 and the voltage probe set 110 are configured to measure the battery total voltage 24 of the batteries 20 to obtain a first analog voltage signal V4 and transmit the first analog voltage signal V4 to the analog-to-digital converting circuit 104, and then the analog-to-digital converting circuit 104 is configured to convert the first analog voltage signal V4 into the first digital voltage signal V1 and transmit the first digital voltage signal V1 to the first processing unit 102. At the first time point, the batteries 20 may be, for example but not limited to, light load or no load (namely, referring to FIG. 2, the battery 20 supplies power to a load 30, and the power consumption of the load 30 makes the battery 20 light load or no load).

Then, at a second time point after the first time point, the first processing unit 102 is configured to use the analog-to-digital converting circuit 104, the current-measuring circuit 106, the direct-current current sensor 127, the voltage-attenuating network 108 and the voltage probe set 110 to measure the battery current 22 and the battery total voltage 24 of the batteries 20 to obtain the second digital current signal I2 and the second digital voltage signal V2. More specifically, at the second time point, the direct-current current sensor 127 and the current-measuring circuit 106 are configured to measure the battery current 22 of the batteries 20 to obtain a second analog current signal I5 and transmit the second analog current signal I5 to the analog-to-digital converting circuit 104, and the voltage-attenuating network 108 and the voltage probe set 110 are configured to measure the battery total voltage 24 of the batteries 20 to obtain a second analog voltage signal V5 and transmit the second analog voltage signal V5 to the analog-to-digital converting circuit 104; then the analog-to-digital converting circuit 104 is configured to convert the second analog current signal I5 and the second analog voltage signal V5 into the second digital current signal I2 and the second digital voltage signal V2, and transmit the second digital current signal I2 and the second digital voltage signal V2 to the first processing unit 102. At the second time point, the batteries 20 may be, for example but not limited to, heavy load (namely, referring to FIG. 2, the battery 20 supplies power to the load 30, and the power consumption of the load 30 makes the battery 20 heavy load).

The first processing unit 102 is configured to subtract the second digital voltage signal V2 from the first digital voltage signal V1 to obtain the voltage difference V3. The first processing unit 102 is configured to subtract the first digital current signal I1 from the second digital current signal I2 to obtain the current difference I3. The first processing unit 102 is configured to divide the voltage difference V3 by the current difference I3 to obtain the overall internal resistance value 26 of the batteries 20. Namely, from the mathematical point of view: (the first digital voltage signal V1−the second digital voltage signal V2)/(the second digital current signal I2−the first digital current signal I1)=the voltage difference V3/the current difference I3=the overall internal resistance value 26. The following FIG. 2 will describe the origin of the above mathematical formula.

Figure 2:
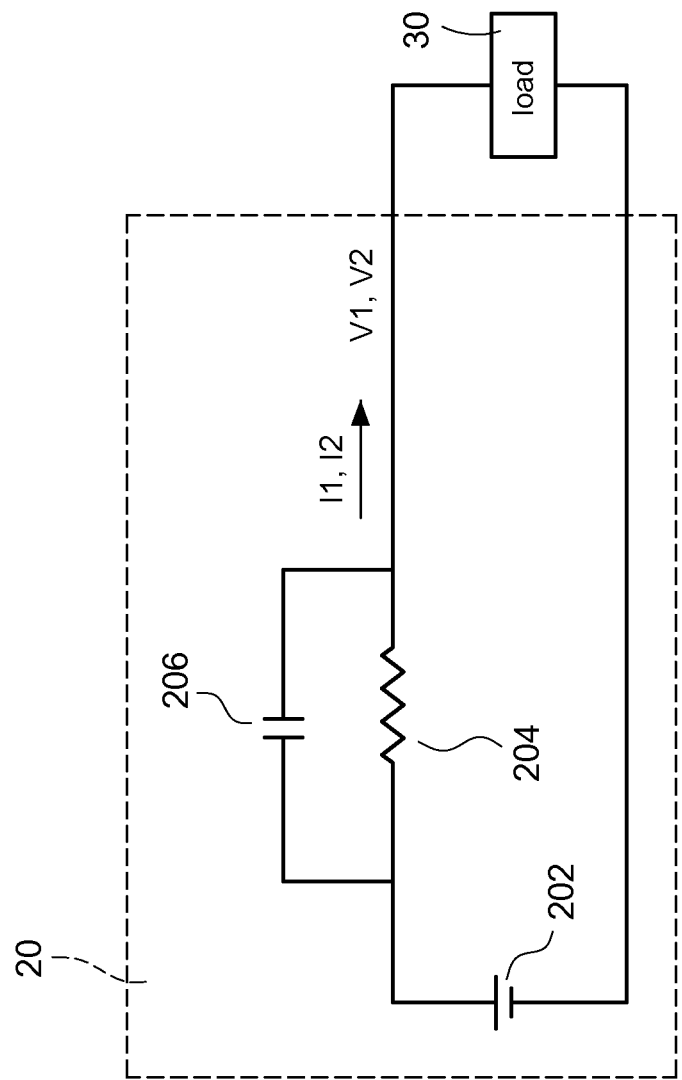
FIG. 2 shows a schematic diagram of calculating the internal resistance value of the battery according to the present disclosure.

FIG. 2 shows a schematic diagram of calculating the internal resistance value of the battery according to the present disclosure. In order to make the calculation of the overall internal resistance value 26 easier to understand: FIG. 2 only shows one battery 20, and ignores the components in the clamp meter system 10. Although the voltages and the currents measured in FIG. 2 are analog signals, the aforementioned digital signals are still used in FIG. 2 for the convenience of explanation. The equivalent circuit of the battery 20 includes a battery component 202, a battery internal resistance 204 and a capacitor 206. The battery 20 is connected to a load 30. It may be known from FIG. 2 that: the first digital voltage signal V1+the first digital current signal I1*the internal resistance value of the battery internal resistance 204=the second digital voltage signal V2+the second digital current signal I2*the internal resistance value of the battery internal resistance 204. Next, the first digital voltage signal V1−the second digital voltage signal V2=the second digital current signal I2*the internal resistance value of the battery internal resistance 204−the first digital current signal I1*the internal resistance value of the battery internal resistance 204=(the second digital current signal I2−the first digital current signal I1)*the internal resistance value of the battery internal resistance 204. Finally, (the first digital voltage signal V1−the second digital voltage signal V2)/(the second digital current signal I2−the first digital current signal I1)=the internal resistance value of the battery internal resistance 204. Therefore, the internal resistance value of the battery is calculated.

Figure 3:
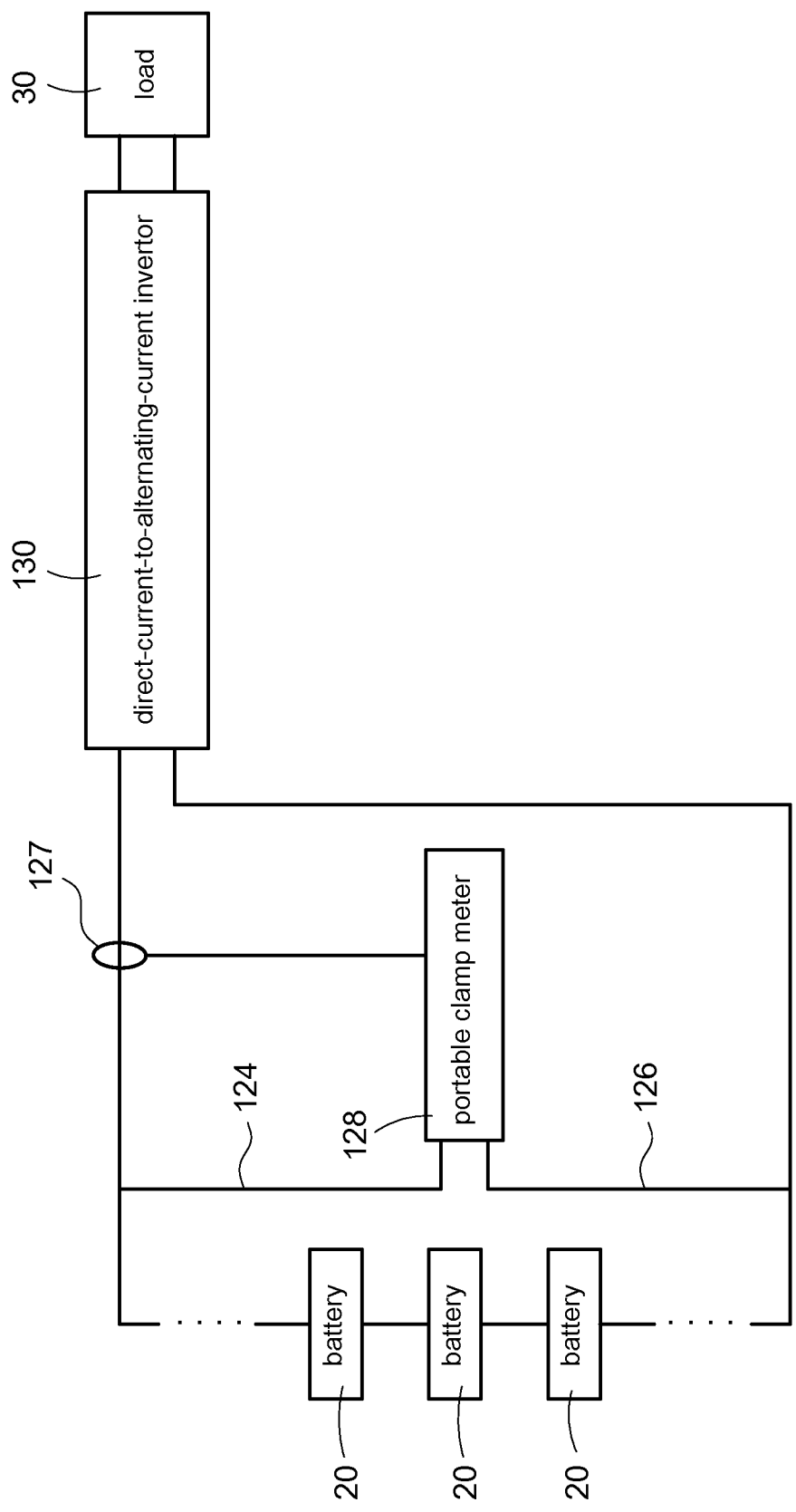
FIG. 3 shows an application block diagram of an embodiment of a portable clamp meter of the present disclosure.

FIG. 3 shows an application block diagram of an embodiment of a portable clamp meter 128 of the present disclosure. Please also refer to FIG. 1 at the same time. The first processing unit 102, the analog-to-digital converting circuit 104, the current-measuring circuit 106, the voltage-attenuating network 108, the voltage probe set 110, the first display 112, the first wireless communication transceiver circuit 114 and the direct-current current sensor 127 shown in FIG. 1 form the portable clamp meter 128 shown in FIG. 3. The portable clamp meter 128 is applied to a direct-current-to-alternating-current invertor 130 and a load 30.

Please refer to FIG. 1 again. The first processing unit 102 is configured to transmit the overall internal resistance value 26 of the batteries 20 to the first display 112 to display the overall internal resistance value 26 of the batteries 20. The first processing unit 102 is configured to transmit the overall internal resistance value 26 of the batteries 20 to the second processing unit 118 through the first wireless communication transceiver circuit 114 and the second wireless communication transceiver circuit 116. The second processing unit 118 is configured to compare the overall internal resistance value 26 of the batteries 20 with an overall internal resistance threshold value 122 (which is, for example but not limited to, provided by the manufacturer of the batteries 20). When the overall internal resistance value 26 of the batteries 20 is greater than the overall internal resistance threshold value 122 (at this time, it represents that at least one of the batteries 20 is seriously aged), the clamp meter system 10 is configured to perform a respective battery internal resistance measuring procedure on each of the batteries 20 to measure an internal resistance value 28 of each of the batteries 20 (to find out the battery 20 which is seriously aged; it will be described in detail in FIG. 4 later). The second processing unit 118 is configured to transmit the overall internal resistance value 26 of the batteries 20 to the second display 120 to display the overall internal resistance value 26 of the batteries 20. The present disclosure may also draw a plurality of the overall internal resistance values 26 into a graph, so as to observe the changes of these overall internal resistance values 26. Furthermore, the wireless transmission and reception of signals between the first wireless communication transceiver circuit 114 and the second wireless communication transceiver circuit 116 belongs to the known technology, so it will not be repeated here.

Figure 4:
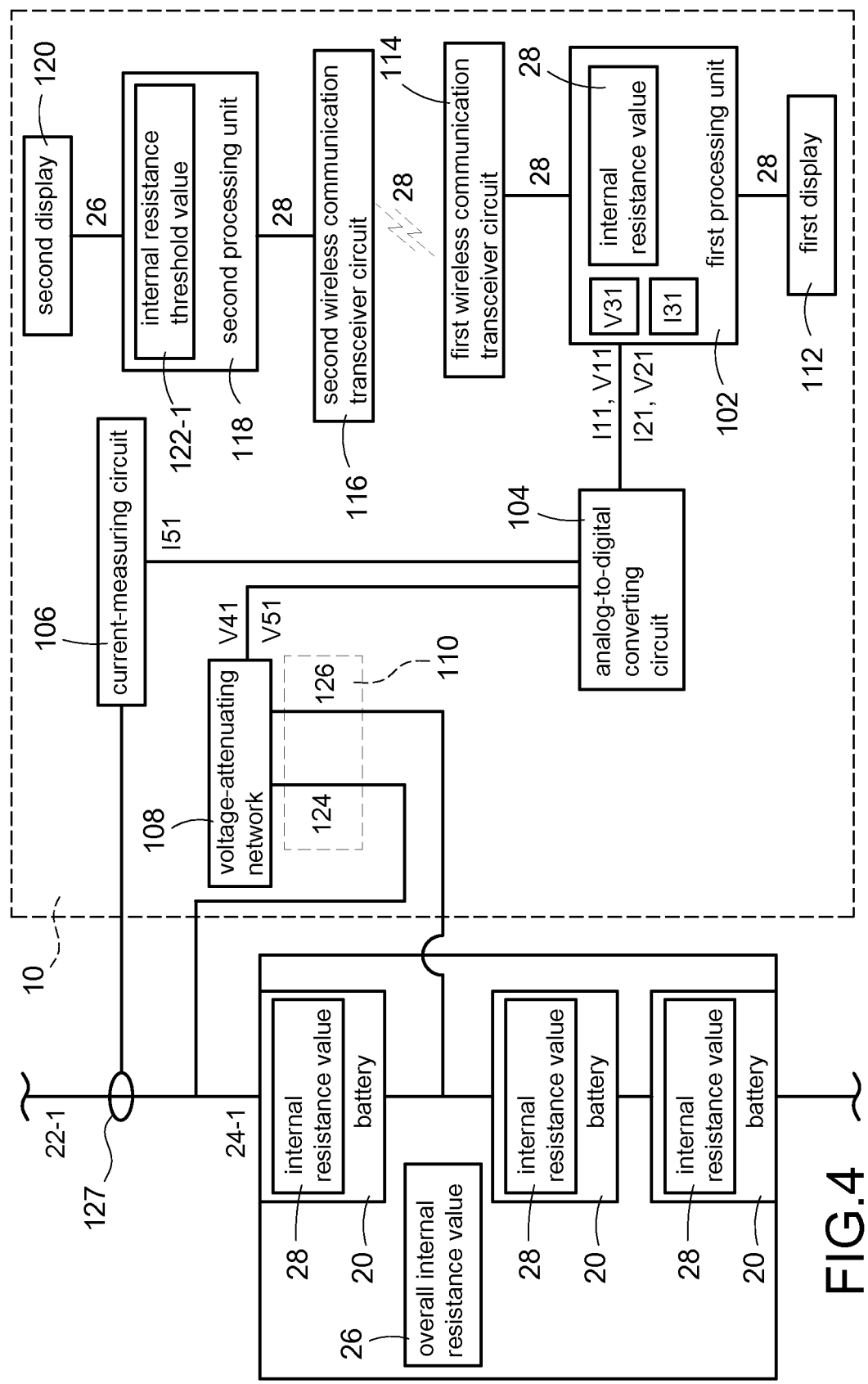
FIG. 4 shows a block diagram of the second embodiment of the clamp meter system with the battery-internal-resistance-measuring function of the present disclosure.

Moreover, FIG. 4 shows a block diagram of the second embodiment of the clamp meter system 10 with the battery-internal-resistance-measuring function of the present disclosure. The descriptions of the elements shown in FIG. 4 which are the same as the elements shown in FIG. 1 are not repeated here for brevity. The first probe 124 is connected to the top of the first battery 20 from top to bottom among the batteries 20 shown in FIG. 4. The second probe 126 is connected to the bottom of the first battery 20 from top to bottom among the batteries 20 shown in FIG. 4. As mentioned above, when the overall internal resistance value 26 of the batteries 20 is greater than the overall internal resistance threshold value 122 (at this time, it represents that at least one of the batteries 20 is seriously aged), the clamp meter system 10 is configured to perform the respective battery internal resistance measuring procedure on each of the batteries 20 to measure the internal resistance value 28 of each of the batteries 20 (to find out the battery 20 which is seriously aged); the details are as follows:

At a third time point, the first processing unit 102 is configured to use the analog-to-digital converting circuit 104, the voltage-attenuating network 108 and the voltage probe set 110 to measure a respective battery voltage 24-1 of one of the batteries 20 (for example, the first battery 20 from top to bottom in FIG. 4) to obtain a first respective digital voltage signal V11. The first processing unit 102 is configured to set a first respective digital current signal I11 to be zero. More specifically, at the third time point, the voltage-attenuating network 108 and the voltage probe set 110 are configured to measure the respective battery voltage 24-1 of one of the batteries 20 (namely, the first battery 20 from top to bottom in FIG. 4) to obtain a first respective analog voltage signal V41 and transmit the first respective analog voltage signal V41 to the analog-to-digital converting circuit 104, and then the analog-to-digital converting circuit 104 is configured to convert the first respective analog voltage signal V41 into the first respective digital voltage signal V11 and transmit the first respective digital voltage signal V11 to the first processing unit 102. At the third time point, the batteries 20 may be, for example but not limited to, light load or no load (namely, referring to FIG. 2, the battery 20 supplies power to the load 30, and the power consumption of the load 30 makes the battery 20 light load or no load).

Then, at a fourth time point after the third time point, the first processing unit 102 is configured to use the analog-to-digital converting circuit 104, the current-measuring circuit 106, the direct-current current sensor 127, the voltage-attenuating network 108 and the voltage probe set 110 to measure a respective battery current 22-1 and a respective battery voltage 24-1 of one of the batteries 20 (namely, the first battery 20 from top to bottom in FIG. 4) to obtain a second respective digital current signal I21 and a second respective digital voltage signal V21. More specifically, at the fourth time point, the direct-current current sensor 127 and the current-measuring circuit 106 are configured to measure the respective battery current 22-1 of one of the batteries 20 (namely, the first battery 20 from top to bottom in FIG. 4) to obtain a second respective analog current signal I51 and transmit the second respective analog current signal I51 to the analog-to-digital converting circuit 104, and the voltage-attenuating network 108 and the voltage probe set 110 are configured to measures the respective battery voltage 24-1 of one of the batteries 20 (namely, the first battery 20 from top to bottom in FIG. 4) to obtain a second respective analog voltage signal V51 and transmit the second respective analog voltage signal V51 to the analog-to-digital converting circuit 104; then the analog-to-digital converting circuit 104 is configured to convert the second respective analog current signal I51 and the second respective analog voltage signal V51 into the second respective digital current signal I21 and the second respective digital voltage signal V21, and transmit the second respective digital current signal I21 and the second respective digital voltage signal V21 to the first processing unit 102. At the fourth time point, the batteries 20 may be, for example but not limited to, heavy load (namely, referring to FIG. 2, the battery 20 supplies power to the load 30, and the power consumption of the load 30 makes the battery 20 heavy load).

The first processing unit 102 is configured to subtract the second respective digital voltage signal V21 from the first respective digital voltage signal V11 to obtain a respective voltage difference V31. The first processing unit 102 is configured to subtract the first respective digital current signal I11 from the second respective digital current signal I21 to obtain a respective current difference I31. The first processing unit 102 is configured to divide the respective voltage difference V31 by the respective current difference I31 to obtain the internal resistance value 28 of one of the batteries 20 (namely, the first battery 20 from top to bottom in FIG. 4). Namely, from the mathematical point of view: (the first respective digital voltage signal V11−the second respective digital voltage signal V21)/(the second respective digital current signal I21−the first respective digital current signal I11)=the respective voltage difference V31/the respective current difference I31=the internal resistance value 28.

The first processing unit 102 is configured to transmit the internal resistance value 28 to the first display 112 to display the internal resistance value 28. The first processing unit 102 is configured to transmit the internal resistance value 28 to the second processing unit 118 through the first wireless communication transceiver circuit 114 and the second wireless communication transceiver circuit 116. The second processing unit 118 is configured to compare the internal resistance value 28 with an internal resistance threshold value 122-1 (which is, for example but not limited to, provided by the manufacturer of the batteries 20). When the internal resistance value 28 is greater than the internal resistance threshold 122-1, the second processing unit 118 is configured to determine that the battery 20 (namely, the first battery 20 from top to bottom in FIG. 4) is seriously aged. The second processing unit 118 is configured to transmit the internal resistance value 28 to the second display 120 to display the internal resistance value 28. After measuring and determining the internal resistance value 28 of the first battery 20 from top to bottom shown in FIG. 4, the present disclosure may measure and determine the remaining batteries 20 respectively. Furthermore, the wireless transmission and reception of signals between the first wireless communication transceiver circuit 114 and the second wireless communication transceiver circuit 116 belongs to the known technology, so it will not be repeated here.

The advantage of the present disclosure is to easily measure the internal resistance of the battery.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A clamp meter system with a battery-internal-resistance-measuring function applied to a plurality of batteries, the batteries connected in series with each other and electrically connected to the clamp meter system, the clamp meter system comprising:
a first processing unit;
an analog-to-digital converting circuit electrically connected to the first processing unit;
a current-measuring circuit electrically connected to the analog-to-digital converting circuit;
a direct-current current sensor electrically connected to the current-measuring circuit;
a voltage-attenuating network electrically connected to the analog-to-digital converting circuit;
a voltage probe set electrically connected to the voltage-attenuating network and the batteries;
a first wireless communication transceiver circuit electrically connected to the first processing unit;
a second wireless communication transceiver circuit electrically connected to the first wireless communication transceiver circuit; and
a second processing unit electrically connected to the second wireless communication transceiver circuit,
wherein the first processing unit is configured to use the analog-to-digital converting circuit, the current-measuring circuit, the direct-current current sensor, the voltage-attenuating network—and the voltage probe set to measure a battery current and a battery total voltage of the batteries to obtain a second digital current signal and a second digital voltage signal; the first processing unit is configured to subtract the second digital voltage signal from a first digital voltage signal to obtain a voltage difference; the first processing unit is configured to subtract a first digital current signal—from the second digital current signal to obtain a current difference; the first processing unit is configured to divide the voltage difference by the current difference to obtain an overall internal resistance value of the batteries;
wherein at a first time point, the first processing unit is configured to use the analog-to-digital converting circuit, the voltage-attenuating network and the voltage probe set to measure the battery total voltage of the batteries to obtain the first digital voltage signal; the first processing unit is configured to set the first digital current signal to be zero; at a second time point, the first processing unit is configured to use the analog-to-digital converting circuit, the current-measuring circuit, the direct-current current sensor, the voltage-attenuating network and the voltage probe set to measure the battery current and the battery total voltage of the batteries to obtain the second digital current signal and the second digital voltage signal;
wherein the first processing unit is configured to transmit the overall internal resistance value of the batteries to the second processing unit through the first wireless communication transceiver circuit and the second wireless communication transceiver circuit; the second processing unit is configured to compare the overall internal resistance value of the batteries with an overall internal resistance threshold value; when the overall internal resistance value of the batteries is greater than the overall internal resistance threshold value, the clamp meter system is configured to perform a respective battery internal resistance measuring procedure on each of the batteries to measure an internal resistance value of each of the batteries.

2. The clamp meter system of claim 1, further comprising:
a first display electrically connected to the first processing unit,
wherein the first processing unit is configured to transmit the overall internal resistance value of the batteries to the first display to display the overall internal resistance value of the batteries.

3. The clamp meter system of claim 2, further comprising:
a second display electrically connected to the second processing unit,
wherein the second processing unit is configured to transmit the overall internal resistance value of the batteries to the second display to display the overall internal resistance value of the batteries.

4. The clamp meter system of claim 3, wherein the analog-to-digital converting circuit is a fast high-resolution analog-to-digital converter to switch the current-measuring circuit and the voltage-attenuating network, or the analog-to-digital converting circuit comprises a plurality of analog-to-digital converters electrically connected to the current-measuring circuit and the voltage-attenuating network respectively.

5. The clamp meter system of claim 4, wherein the current-measuring circuit is a galvanometer; the voltage-attenuating network is an attenuator.

6. The clamp meter system of claim 5, wherein the first wireless communication transceiver circuit is a Bluetooth wireless communication circuit; the second wireless communication transceiver circuit is a Bluetooth wireless communication circuit.

7. The clamp meter system of claim 6, wherein the first processing unit is a microprocessor or a microcontroller; the second processing unit is a microprocessor or a microcontroller.

* * * * *